US 6,706,653 B2

(12) United States Patent
Comte

(10) Patent No.: US 6,706,653 B2
(45) Date of Patent: Mar. 16, 2004

(54) GLASS-CERAMIC AND A PROCESS FOR OBTAINING IT

(75) Inventor: Marie J. M. Comte, Fontenay aux Roses (FR)

(73) Assignee: Eurokera, Chateau-Thierry (FR)

( * ) Notice: Subject to any disclaimer, the term of this patent is extended or adjusted under 35 U.S.C. 154(b) by 0 days.

(21) Appl. No.: 10/241,309

(22) Filed: Sep. 10, 2002

(65) Prior Publication Data

US 2003/0073562 A1 Apr. 17, 2003

(30) Foreign Application Priority Data

Sep. 28, 2001 (FR) .............................. 01 12501

(51) Int. Cl.⁷ .............................................. C03C 10/14
(52) U.S. Cl. ................. 501/4; 501/7; 65/33.1; 65/33.7
(58) Field of Search .................... 501/4, 7; 65/33.1, 65/33.7, 33.8

(56) References Cited

U.S. PATENT DOCUMENTS

| 3,241,985 A | 3/1966 | Kuwayama ................... 106/39 |
| 3,617,317 A | 11/1971 | Sack et al. ..................... 106/52 |
| 4,707,458 A | 11/1987 | Chyung et al. ................. 501/4 |
| 4,733,947 A | 3/1988 | Ota et al. ..................... 350/334 |
| 4,851,372 A | 7/1989 | Lindig et al. .................. 501/4 |
| 5,070,045 A | 12/1991 | Comte et al. .................. 501/4 |
| 6,528,440 B1 * | 3/2003 | Vilato et al. ................... 501/7 |

FOREIGN PATENT DOCUMENTS

| EP | 0853071 | 9/1996 | .......... C03C/10/00 |
| EP | 1029830 | 1/2000 | .......... C03C/10/12 |
| EP | 1170262 | 4/2001 | .......... C03C/3/087 |
| FR | 1 337 180 | 9/1963 | |

OTHER PUBLICATIONS

Article by G.H. Beall et al. entitled: "Crystallization and Chemical Strengthening of Stuffed β–Quartz Glass–Ceramics", in the Journal of the American Ceramic Society, vol. 50, No. 4., p. 181–190 (Apr. 1967).

Patent Abstract of Japan, vol. 014, No. 100 (C–0693), Feb. 23, 1990 corresponding with Publication No. 01308845.

Document Bibliography and Abstract for Patent No. EP1029830 taken from http://12.espacenet.com/escapenet/abstract?CY=ep&LG=en&PNP=EP1029830&PN=EP1 dated Oct. 24, 2002.

* cited by examiner

*Primary Examiner*—Karl Group
(74) *Attorney, Agent, or Firm*—Siwen Chen

(57) ABSTRACT

The present invention relates to:
  a glass-ceramic
    which is opaque
    which has a low, or zero thermal expansion coefficient,
    which contains a solid solution of β-quartz as crystalline phase,
    which has a specific composition; and, to
  a process for obtaining said glass-ceramic.

10 Claims, No Drawings

GLASS-CERAMIC AND A PROCESS FOR OBTAINING IT

This application claims the benefit of French Patent Application No. 01 12501 filed on Sep. 28, 2001.

The present invention relates to:
- a glass-ceramic, which is opaque, and has a low, or zero thermal expansion coefficient, and which contains a solid solution of β-quartz as crystalline phase; and
- a process of obtaining said glass-ceramic.

Glass-ceramics are materials which are known per se, and which are obtained by heat treatment of mineral glasses.

These materials are used in various contexts and notably as substrates of cooktops and as anti-fire windows (having a resistance to thermal breakage and thus preventing the spread of a fire).

It is important for the applications of this nature that said glass-ceramics resist not only to the high temperatures but also to the wide variations in temperature. In particular, in the case of a substrate for cooktops, such variations in temperature manifest themselves not only rapidly but also in a non-uniform manner within the mass, such that a part of said substrate can cool down or heat up very rapidly, while the temperature of the other parts can remain unchanged or can vary much more slowly. Thus, it is desirable to have glass-ceramics at one's disposal which have a very low thermal expansion coefficient, preferably with such a thermal expansion coefficient of zero or near-zero.

Furthermore, transparent and opalescent glass-ceramics, even opaque glass-ceramics are known.

More specifically:
- the article by G. H. Beall entitled: "Crystallization and Chemical Strengthening of Stuffed β-Quartz Glass-Ceramics", in the Journal of the American Ceramic Society, Vol. 50., No. 4., p. 181–190 (April 1967) gives, in general, β-quartz glass-ceramics (which contain a solid solution of β-quartz as crystalline phase). Said article indicates the ranges of composition of glass which enable said glass-ceramics to be obtained, the ranges of ceramming temperature, the ranges of expansion of said glass-ceramics, the possibility of high-temperature decomposition of the β-quartz phase. Said article describes no opaque glass-ceramic of zero expansion and all the time indicates ceramming times of at least 4 hours;
- the patent application EP-A-0-853 071 describes β-quartz and β-spodumene glass-ceramics (which contain a solid solution of β-quartz or β-spodumene, respectively, as crystalline phase). The described β-quartz glass-ceramics (which are not opaque) are different from the ones of the invention;
- the patent application EP-A-1 029 830 describes β-quartz glass-ceramics (which contain a solid solution of β-quartz as crystalline phase), which are opaque, and which are of zero expansion. However, said glass-ceramics are different from the glass-ceramics of the invention and the ceramming times described are of the order of at least 6 hours;
- U.S. Pat. No. 5,070,045 describes β-quartz glass-ceramics (which contain a solid solution of β-quartz as crystalline phase), which have zero expansion, which are transparent, and obtainable by a ceramming treatment of less than 2 hours. The inventors wished to confer an opaque aspect to these glass-ceramics. Thus, they crystallised the glass precursors of said glass-ceramics at a higher temperature (around >950° C.). However, the opacification is then accompanied by a change of crystalline phase: the main phase becomes a solid solution of β-spodumene. This conversion has the drawback, for the applications sought after, of being accompanied with an increase in the thermal expansion coefficient. This latter value becomes close to $10 \times 10^{-7}$ $K^{-1}$.

The glass compositions described in U.S. Pat. No. 5,070,045 thus have been modified, in accordance with the invention, in order to be able to generate opaque glass-ceramics of zero expansion. It was sought to obtain the opacification while at the same time preventing the conversion, of the β-quartz phase into the β-spodumene phase, which leads to the increase of the expansion. The conversion into other phases of high expansion (such as spinel) should also be avoided.

It is noted at this juncture that the presence of a solid solution of β-quartz, as main phase, is not in itself a guarantee to obtain a zero expansion. As indicated in the article cited above, numerous oxides can enter into the composition of this solid solution, in particular $Li_2O$, MgO, ZnO and $Al_2O_3$. According to the content of each one of these oxides, the expansion of the crystalline phase and, thus, that of the glass-ceramic, can vary within a very large range (of around −20 to +50 $10^{-7}K^{-1}$ for the glass-ceramic).

The technical problem tackled has thus been that of determining the levels of the various oxides not only in order to avoid the conversion into β-spodumene, but more specifically to obtain, advantageously in less than two hours, an opaque glass-ceramic with a thermal expansion coefficient of practically zero.

It was observed in a surprising way that this result could be obtained, with respect to the teaching of U.S. Pat. No. 5,070,045, by lowering the content of $Li_2O$, while at the same time limiting the content of MgO and by increasing the content of ZnO; contents of $Li_2O$, MgO and ZnO of the precursor mineral glasses and of the final glass-ceramics.

The glass-ceramics of the invention are thus opaque glass-ceramics which are particularly interesting with reference to their thermal expansion coefficient and which moreover have the advantage of being able to be obtained at the end of a short heat treatment (of less than two hours) of their precursor glasses.

According to a first object, the present invention relates to original glass-ceramics which:
  are opaque;
  have a low, or zero thermal expansion coefficient (of $0\pm5\times10^{-7}$ $K^{-1}$, advantageously of $0\pm3\times10^{-7}$ $K^{-1}$);
  contain a solid solution of β-quartz as crystalline phase, and
  which composition essentially consists, by weight percent, of:
    65 to 72% of $SiO_2$
    16 to 24% of $Al_2O_3$
    2 to less than 3% of $Li_2O$,
    0 to 1% of MgO
    3 to 5% of ZnO
    0 to 1.5% of BaO
    2 to 4.5% of $TiO_2$ and/or $ZrO_2$, with the $Al_2O_3/(TiO_2+ZrO_2)$ ratio >5, 0 to an effective and non excessive amount of a least one fining agent, and less than 1% of $K_2O$ and/or $Na_2O$.

From mineral glasses having the composition indicated above (for the glass-ceramics of the invention obtained from said mineral glasses) the inventors have surprisingly obtained opaque glass-ceramics which have low or zero thermal expansion coefficient and which contain a solid solution of β-quartz as crystalline phase.

In reference to the said composition (of the glass-ceramics of the invention as well as of the mineral glasses, precursors of the said glass-ceramics of the invention) the following may be precised.

$SiO_2$ is a classical component which forms mineral glasses. Its content must be less than 72% in order to limit the melting point and greater than 65% in order to avoid devitrification during cooling.

$Al_2O_3$ is incorporated at a relatively significant content since it is one of the main constituents of the crystalline phase. Surprisingly, it was observed that it was easier to obtain an opaque material when said $Al_2O_3$ content increased. With too high an $Al_2O_3$ content, the tendency of devitrification during cooling becomes unacceptable.

$Li_2O$ is a key element of the crystallisation. When it is incorporated at a content of less than 2%, it is difficult to obtain the crystalline phase. When it is incorporated at a content of greater than 3%, the opacification tends to be accompanied by a conversion into β-spodumene.

MgO tends to increase the expansion: it is for this reason that its content is limited to 1%. Its presence is not indispensable.

$K_2O$ and $Na_2O$ also tends to increase the expansion: it is for this reason that their content ($K_2O$ alone, $Na_2O$ alone or $K_2O+Na_2O$ in combination) is limited to 1%, advantageously 0.5% (the composition advantageously comprises less than 0.5% of $K_2O+Na_2O$). Their presence is in no way indispensable, is actually undesirable. Said elements are advantageously absent and are actually generally present only as impurities.

ZnO is in quite a significant amount in order to compensate the low levels of $Li_2O$ and MgO.

$TiO_2$ and $ZrO_2$ are the nucleation agents. They can be incorporated independently of each other ($TiO_2$ or $ZrO_2$) or, advantageously, in combination ($TiO_2$ and $ZrO2$). In order to facilitate obtaining opaque materials, their total content must not be greater than 4.5%. In order to maintain a satisfactory opacity, it was observed that if the $Al_2O_3$ content decreases, the total content of nucleation agents should decrease. It is for this reason that it is highly desirable that the $Al_2O_3/(TiO_2+ZrO_2)$ ratio remain greater than 5.

BaO is an optional component. It enables the viscosity of the glass to be lowered and from this, it facilitates the melting and the ceramming.

Advantageously, at least one fining agent is incorporated in an effective and non-excessive amount. Such an effective and non-excessive amount is generally inferior or equal to 2%. $As_2O_3$ and/or $Sb_2O_3$ may be used as classical fining agent. The use of other fining agents such as $SnO_2$, $CeO_2$ and Cl is not excluded.

As well as the essential and optional constituents set forth above, the glass-ceramics of the invention can contain other constituents. Obviously, they contain such other constituents only in a limited amount (generally less than 5%, more generally less than 2%), only an amount which does not jeopardise the characteristics of the glass-ceramics of the invention. Thus, it is in no way excluded that the glass-ceramics of the invention contain CaO, SrO, $SnO_2$ and/or $P_2O_5$.

Preferably, the glass-ceramics of the invention essentially have the composition below, expressed in percentages by weight of oxides:

65 to 72% of $SiO_2$
17 to 21% of $Al_2O_3$
2 to less than 3% of $Li_2O$
0 to 1% of MgO
3 to 4.5% of ZnO
0 to 1.5% of BaO
1.5 to 3% of $TiO_2$
0.5 to 1.8% of $ZrO_2$
with $TiO_2+ZrO_2 \leq 4.5\%$, and
  the $Al_2O_3/(TiO_2+ZrO_2)$ ratio >5
0 to an effective and non excessive amount of at least one fining agent, and
less than 1% (advantageously 0.5%) of $K_2O$ and/or $Na_2O$.

The preferred ranges indicated above can be considered independently of each other. Taken in combination, they define a preferred composition by weight of the glass-ceramics of the invention.

In general, the said glass-ceramics of the invention advantageously have an MgO content of between 0 and 0.5%.

According to a second object, the present invention relates to a process for obtaining the glass-ceramics of the invention. The said process classically comprises:

preparing, in the molten state, a mineral glass, precursor of a glass-ceramic;

shaping said molten mineral glass; and heat treating said shaped molten mineral glass.

Characteristically, in order to obtain the said glass-ceramics of the invention, the precursor mineral glass has a specific composition and the heat treatment is carried out at a relatively high temperature.

The said process of the invention actually comprises the following steps:

preparing, in the molten state, a mineral glass, which composition essentially consists, by weight percent, of:
65 to 72% of $SiO_2$
16 to 24% of $Al_2O_3$
2 to less than 3% of $Li_2O$,
0 to 1% of MgO
3 to 5% of ZnO
0 to 1.5% of BaO
2 to 4.5% of $TiO_2$ and/or $ZrO_2$, with the $Al_2O_3/(TiO_2+ZrO_2)$ ratio >5,
0 to an effective and non excessive amount of a least one fining agent, and
less than 1% of $K_2O$ and/or $Na_2O$;

shaping said molten mineral glass; and heat treating said shaped molten mineral glass at a ceramming temperature of at least 980° C., generally at a temperature between 980° C. and 1 150° C.

Advantageously, the precursor mineral glass has essentially the following composition, expressed in weight percent:

65 to 72% of $SiO_2$
17 to 21% of $Al_2O_3$
2 to less than 3% of $Li_2O$
0 to 1% of Mgo
3 to 4.5% of ZnO
0 to 1.5% of BaO
1.5 to 3% of $TiO_2$
0.5 to 1.8% of $ZrO_2$
with $TiO_2+ZrO_2 \leq 4.5\%$, and
  the $Al_2O_3/(TiO_2+ZrO_2)$ ratio >5
0 to an effective and non excessive amount of at least one fining agent, and
less than 1% (advantageously 0.5%) of $K_2O$ and/or $Na_2O$.

The ceramming heat treatment is carried out at a temperature of at least 980° C. It is generally carried out at a temperature between 980° C. and 1 150° C.; it is advantageously carried out at a temperature between 1 000 and 1 125° C.

It is quite possible and interesting to obtain the glass-ceramics of the invention with a duration of the ceramming heat treatment (also called ceramming time) not exceeding 2 hours.

It is not excluded from the context of the present invention to carry out ceramming for more than 2 hours. However, at the above mentioned high ceramming temperatures, it may be possible to convert the β-quartz phase into a β-spodumene one and to increase the thermal expansion coefficient. The man skilled in the art will be able to determine and optimise the process parameters (temperature, duration, composition of the mineral glass) to obtain the opaque expected glass-ceramics.

According to an embodiment, the heat treatment in question includes a heating up to the temperature, known as the ceramming temperature, followed by an upkeep of said ceramming temperature. Said upkeep can be limited to 15 minutes. Said ceramming temperature is of at least 980° C., generally between 980° C. and 1 150° C., advantageously between 1 000 and 1 125° C. (see above).

Furthermore, it was observed that the thermal expansion coefficient of the glass-ceramics of the invention varies with their ceramming temperature, i.e. the temperature at which their glass precursor was brought to and kept at; said coefficient increases with said ceramming temperature. Thus, it is possible to determine, on the glass samples, the ceramming temperature which leads to a glass-ceramic having a given low thermal expansion coefficient, which is advantageously zero, and then to carry out the production of said glass-ceramic by ensuring the ceramming with an upkeep of the ceramming temperature determined beforehand.

Thus, the implementation of the process for obtaining a glass-ceramic of the invention is advantageously preceded by a prior experimentation on the glass concerned, with the view to detecting the ceramming temperature of said glass which generates a glass-ceramic having a thermal expansion coefficient which is fixed, low, advantageously zero; said implementation thus comprises, within the context of the heat treatment, the upkeep of the glass at said ceramming temperature determined beforehand.

The invention is illustrated by the examples below (Examples 1 to 3).

The following is in fact specified in Table I below:

- the composition by weight (expressed in percentages by weight of oxides) of the precursor mineral glasses (the said composition is the one of the final glass-ceramics);
- the characteristics of the heat treatment of said glasses with the view to their ceramming; and
- properties (thermal expansion coefficient, transmission, nature of the crystalline phase observed) of the glass-ceramics obtained at the end of said heat treatment. The transmission was measured on polished samples of 3 mm thickness. The measurements were effected with the illuminant C, at the rate of one measurement every nm. The value given is the direct transmission integrated between 360 and 830 nm.

TABLE I

| Composition (% by weight) | 1 | 2 | 3 |
|---|---|---|---|
| $SiO_2$ | 69.95 | 66.05 | 70.35 |
| $Al_2O_3$ | 18.9 | 22 | 18.9 |
| $Li_2O$ | 2.6 | 2.6 | 2.6 |
| MgO | 0.3 | 0.3 | 0.3 |
| ZnO | 3.5 | 3.5 | 3.5 |
| BaO | 0.85 | 0.85 | 0.85 |
| $TiO_2$ | 2 | 2.8 | 1.6 |
| $ZrO_2$ | 1.3 | 1.3 | 1.3 |
| $TiO_2 + ZrO_2$ | 3.3 | 4.1 | 2.9 |
| $Al_2O_3/(TiO_2 + ZrO_2)$ | 5.73 | 5.37 | 6.52 |
| $As_2O_3$ | 0.6 | 0.6 | 0.6 |
| Heat treatment of ceramming | 750–1,050° C.: 4.5° C./min 1,050° C.: 15 min | 750° C.–1,000° C.: 4.5° C./min 1,000° C.: 15 min | 750° C.–1,125° C.: 4.5° C./min 1,125° C.: 15 min |
| Properties after ceramming: | | | |
| Expansion −25° C.–700° C. | $1.5 \times 10^{-7} K^{-1}$ | $-3 \times 10^{-7} K^{-1}$ | $1.2 \times 10^{-7} K^{-1}$ |
| Aspect | opaque | opaque | opaque |
| Transmission (3 mm) | 0.20% | 0.32% | 0.38% |
| Crystalline phase (XRD) | β-quartz | β-quartz | β-quartz |

The initial batches of glass are prepared in the usual manner from oxides and/or from easily decomposable compounds such as nitrates and carbonates. The materials of the batches are mixed in order to obtain a homogeneous mixture. About 1,200 g of a batch are placed in a platinum crucible which is placed in an electric oven functioning at 1,650° C. for 10 hours in order to melt the batch.

The molten glass is poured onto a lamination table and is laminated into a sheet of thickness of about 6 mm which is then subjected to an annealing in a known manner for 1 hour at 650° C.

The annealed sheet is then cerammed according to the following program:

rapid heating to 750° C.;
heating at 4.5° C./min from 750° C. to an upkeep temperature (ceramming temperature) situated between 1,000 and 1,125° C.;
upkeep at said selected ceramming temperature for 15 minutes in order to produce a glass-ceramic.

The X-ray diffraction (XRD) analysis of the opaque glass-ceramic thus obtained constantly reveals a β-quartz crystalline phase.

With an upkeep time at the ceramming temperature relatively short, a β-quartz crystalline phase having a low thermal expansion coefficient have been obtained. Despite the constant X-ray diffraction diagram, it is observed that the thermal expansion coefficient depends upon the ceramming temperature, and, more specifically, that it increases with the ceramming temperature. This noting has been illustrated by a test in which the glass samples of Example 1 of Table I were kept for 15 minutes at two different ceramming temperatures in the following manner:

TABLE II

| Ceramming temperature* | Thermal expansion coefficient |
| --- | --- |
| (° C.) | (−25° C.–700° C.) |
| 1,025 | −2 × 10⁻⁷ K⁻¹. |
| 1,050 | +1.5 × 10⁻⁷ K⁻¹. |

*Temperature to which the glasses were brought to (after a rapid heating up to 750° C. followed by a heating at 4.5° C./min from 750° C. to said temperature) and then kept for 15 minutes.

It is noticed that it is possible to obtain, according to the invention, a glass-ceramic having a thermal expansion coefficient of zero or almost zero by virtue of a simple experimentation with a given precursor mineral glass.

What is claimed is:

1. A glass-ceramic
   which is opaque,
   which has a low, or zero thermal expansion coefficient,
   which contains a solid solution of β-quartz as crystalline phase,
   which composition essentially consists, by weight percent, of:
     65 to 72% of $SiO_2$
     16 to 24% of $Al_2O_3$
     2 to less than 3% of $Li_2O$
     0 to 1% of MgO
     3 to 5% of ZnO
     0 to 1.5% of BaO
     2 to 4.5% of $TiO_2$ and/or $ZrO2$, with the $Al_2O_3/(TiO_2+ZrO_2)$ ratio >5,
     0 to an effective and non excessive amount of a least one fining agent, and less than 1% of $K_2O$ and/or $Na_2O$.

2. The glass-ceramic according to claim 1, which composition essentially consists, by weight percent, of:
     65 to 72% of $SiO_2$
     17 to 21% of $Al_2O_3$
     2 to less than 3% of $Li_2O$
     0 to 1% of MgO
     3 to 4.5% of ZnO
     0 to 1.5% of BaO
     1.5 to 3% of $TiO_2$
     0.5 to 1.8% of $ZrO_2$
     with $TiO_2+ZrO_2<4.5\%$, and
       the $Al_2O_3/(TiO_2+ZrO_2)$ ratio >5,
     0 to an effective and non excessive amount of at least one fining agent, and
     less than 1% of $K_2O$ and/or $Na_2O$.

3. The glass-ceramic according to claim 1, which composition contains 0 to 0.5% of MgO.

4. The glass-ceramic according to claim 2, which composition contains 0 to 0.5% of MgO.

5. A process for obtaining a glass-ceramic according to claim 1, which comprises:
   preparing, in the molten state, a mineral glass which composition essentially consists, by weight percent, of
     65 to 72% of $SiO_2$
     16 to 24% of $Al_2O_3$
     2 to less than 3% of $Li_2O$
     0 to 1% of MgO
     3 to 5% of ZnO
     0 to 1.5% of BaO
     2 to 4.5% of $TiO_2$ and/or $ZrO_2$, with the $Al_2O_3/(TiO_2+ZrO_2)$ ratio >5,
     0 to an effective and non excessive amount of a least one fining agent, and less than 1% of $K_2O$ and/or $Na_2O$;
   shaping said molten mineral glass; and
   heat treating said shaped molten mineral glass at a ceramming temperature of at least 980° C., advantageously at a temperature between 980C and 1150C.

6. The process of claim 5, wherein the composition of the said mineral glass essentially consists, by weight percent, of:
     65 to 72% of $SiO_2$
     17 to 21% of $Al_2O_3$
     2 to less than 3% of $Li_2O$
     0 to 1% of MgO
     3 to 4.5% of ZnO
     0 to 1.5% of BaO
     1.5 to 3% of $TiO_2$
     0.5 to 1.8% of $ZrO_2$
     with $TiO_2+ZrO_2 \leqq 4.5\%$, and
       the $Al_2O_3/(TiO_2+ZrO_2)$ ratio >5,
     0 to an effective and non excessive amount of at least one fining agent, and
     less than 1% of $K_2O$ and/or $Na_2O$.

7. The process according to claim 5, wherein the duration of the said heat treatment does not exceed 2 hours.

8. The process according to claim 6, wherein the duration of the said heat treatment does not exceed 2 hours.

9. The process according to claim 5, wherein its implementation is preceded by a prior experimentation on the mineral glass concerned, with the view to detecting the ceramming temperature of said glass which generates a glass-ceramic of a given low thermal expansion coefficient, which is advantageously zero; said implementation thus comprising, in the context of the heat treatment, keeping the glass at said pre-determined ceramming temperature.

10. The process according to claim 6, wherein its implementation is preceded by a prior experimentation on the mineral glass concerned, with the view to detecting the ceramming temperature of said glass which generates a glass-ceramic of a given low thermal expansion coefficient, which is advantageously zero; said implementation thus comprising, in the context of the heat treatment, keeping the glass at said pre-determined ceramming temperature.

* * * * *